US008045798B2

(12) United States Patent
Blessan et al.

(10) Patent No.: US 8,045,798 B2
(45) Date of Patent: Oct. 25, 2011

(54) FEATURES GENERATION AND SPOTTING METHODS AND SYSTEMS USING SAME

(75) Inventors: Marco Blessan, Grenoble (FR); Jutta Katharina Willamowski, Grenoble (FR)

(73) Assignee: Xerox Corporation, Norwalk, CT (US)

(*) Notice: Subject to any disclaimer, the term of this patent is extended or adjusted under 35 U.S.C. 154(b) by 1090 days.

(21) Appl. No.: 11/847,742

(22) Filed: Aug. 30, 2007

(65) Prior Publication Data

US 2009/0060396 A1    Mar. 5, 2009

(51) Int. Cl.
*G06K 9/34*    (2006.01)
*G06K 7/10*    (2006.01)
(52) U.S. Cl. .................................. 382/173; 382/321
(58) Field of Classification Search .......... 382/173–180, 382/187, 194, 225, 229, 317, 321
See application file for complete search history.

(56) References Cited

U.S. PATENT DOCUMENTS

| | | | |
|---|---|---|---|
| 5,438,630 A | 8/1995 | Chen et al. | |
| 5,745,600 A | 4/1998 | Chen et al. | |
| 5,825,919 A | 10/1998 | Bloomberg et al. | |
| 5,841,902 A | 11/1998 | Tu | |
| 6,038,340 A * | 3/2000 | Ancin et al. | 382/167 |
| 6,108,444 A | 8/2000 | Syeda-Mahmood | |
| 6,356,655 B1 | 3/2002 | Sumikawa et al. | |
| 6,424,728 B1 | 7/2002 | Ammar | |
| 6,917,708 B2 | 7/2005 | Goodman et al. | |
| 6,985,859 B2 | 1/2006 | Morin | |
| 7,020,338 B1 | 3/2006 | Cumbee | |
| 7,099,507 B2 | 8/2006 | Ouchi | |
| 7,139,438 B2 * | 11/2006 | Shimazawa | 382/282 |
| 2007/0183655 A1 * | 8/2007 | Konig et al. | 382/159 |

OTHER PUBLICATIONS

Majhi et al, "Novel Features for Off-line Signature Verification", International Journal of Computers, Communications & Control, vol. I (2006), No. 1, pp. 17-24.*
Quadtree, from Wikipedia, pp. 2, at http://en.wikipedia.org/wiki/Quadtree, last visited Jul. 3, 2007.
Rath et al., "Word Image Matching Using Dynamic Time Warping," Proc. of the Conf. on Computer Vision and Pattern Recognition (CVPR), Madison, WI, vol. 2 pp. 1-7, 2003.
Kane et al., "Indexing George Washington's Handwritten Manuscripts," Technical Report, University of Massachusetts Amherst, pp. 1-20, 2001.

(Continued)

*Primary Examiner* — Gregory M Desire
*Assistant Examiner* — Andrae S Allison
(74) *Attorney, Agent, or Firm* — Fay Sharpe LLP (57) ABSTRACT

An image partitioner is configured to find a partition point that divides a received image into four sub-images each having a pre-selected activated pixel count. A recursion processor is configured to (i) apply the image partitioner to an input image to generate a first partition point and four sub-images and to (ii) recursively apply the image partitioner to at least one of the four sub-images for at least one recursion iteration to generate at least one additional partition point. A formatter is configured to generate a features representation of the input image in a selected format. The features representation is based at least in part on the partition points. The features representation can be used in various ways, such as by a classifier configured to classify the input image based on the features representation.

22 Claims, 4 Drawing Sheets

OTHER PUBLICATIONS

Shen et al., "Off-line Signature Verification Using Geometric Features Specific to Chinese Handwriting," 24$^{th}$ Int. Conf. Information Technology Interfaces ITI, Cavtat, Croatia, pp. 229-235, 2002.

Srihari et al., "Spotting Words in Latin, Devanagari and Arabic Scripts," Indian Journal of Artificial Intelligence, pp. 1-8, 2006.

Rath et al., "Features for Word spotting in Historical Manuscripts," ISSN 0-7695-1960-1, pp. 1-5, 2003.

Vinciarelli et al., "Offline Recognition of Unconstrained Handwritten texts . . . ," IEEE Transactions on Pattern Analysis and Machine Intelligence, 16(6), pp. 709-720, 2004.

Marti et al., "Using a Statistical Language Model to Improve . . . ," ISSN 981-02-4564-5, pp. 1-27, 2002.

U.S. Appl. No. 11/847,757, filed Aug. 2007, Serrano.

Marti et al., "Text Line Segmentation and Word Recognition . . . ," IEEE, pp. 159-163, 2001.

Ataer et al., "Retrieval of Ottoman Documents," ACM, pp. 155-162, 2006.

Manmatha et al., "Word Spotting: Indexing Handwritten Archives," AAAI/MIT Press, 1997.

Plamondon et al., "On-Line and Off-Line Handwriting Recognition: A Comprehensive Survey," IEEE Transactions on Pattern Analysis and Machine Intelligence, vol. 22, No. 1, pp. 63-84, 2000.

Viola et al., "Robust Real-Time Face Detection," Intl. Journal of Computer Vision 57(2), pp. 137-154, 2004.

Vinciarelli, "A Survey on Off-Line Cursive word Recognition," IDIAP-RR 00-43, 2002.

Majhi et al., "Novel Features for Off-line Signature Verification," CCC Publications, vol. I, pp. 17-24, 2006.

Trier et al., "Feature Extraction Methods for Character Recognition—A Survey," Pattern Recognition 29, pp. 641-662, 1996.

\* cited by examiner

FEATURES GENERATION AND SPOTTING METHODS AND SYSTEMS USING SAME

BACKGROUND

The following relates to the image processing, analysis, classification, comparison, detection, and related arts. The following is described with illustrative reference to spotting applications such as word spotting, logo spotting, signature spotting, and so forth, but will be useful in numerous other applications.

Optical character recognition (OCR) is a known technique for converting an optically scanned handwritten or typed document to an ASCII, XML, or other text-based format. Existing commercial OCR products include, for example, FineReader™ (available from ABBYY USA Software House, Fremont, Calif.). The OCR converted document is readily searched for words of interest. OCR has numerous advantages, but is computationally intensive and sensitive to image quality.

Word spotting (or, more generally, spotting, which can apply to words, objects such as logos, signatures, and so forth, sometimes also referred to as word detection, logo detection or so forth or as word matching, logo matching, or so forth) relates to identification of a certain word of interest in a document image or collection of document images without resort to OCR. Documents processed with word spotting may then be totally or partially processed by OCR, indexed, or flagged for other review or processing. In some applications, the information extracted by word spotting techniques is used for annotating, routing, filtering and redirecting documents. Word spotting operates in image space without conversion to text, and therefore can be computationally efficient as compared with OCR, and can provide a good alternative to manual review of incoming documents.

A typical word spotting algorithm starts by segmenting the document in image space into image blocks corresponding to individual words. The document is typically generated by an optical scanner or digital camera, although the document may be generated or acquired in other ways. The segmenting is suitably done by identifying whitespace that typically surrounds each word and using the whitespace to delineate boundaries of extracted word images. Prior or inferred structural inferred can also be used at this stage, for instance the knowledge that the word can only be present on the document header. Word segmentation can also include global document pre-processing such as orientation correction, de-noising, illumination normalization, document region segmentation, etc. Features are derived from each extracted image, and the features are processed by a classifier to determine whether any extracted image corresponds to a word of interest.

A suitable type of classifiers for word spotting and other detection algorithms are cascaded classifiers that include at least two classifier stages. Some cascade arrangements include one or more fast rejection stages that are computationally efficient, and one or more additional stages that are more computationally intensive but only process the relatively few segmentation blocks that pass through the fast rejection stages. In such an arrangement, any fast rejection stage should produce a low rate of false rejections since any false rejection is not passed onto the downstream stage and hence is irrevocably lost. On the other hand, the fast rejection stage can have a relatively high rate of false positives since any false positive is likely to be corrected (i.e., rejected) by the slower but more accurate downstream stage or stages. It is desirable for the fast rejection stage to be readily configurable to process various different types of words. For example, an environmental agency may want to be able to spot documents containing the word "carcinogenic" and also documents containing the very different word "sulfur". In some applications in which it is only desired to screen out documents that clearly do not include the word, object, or so forth that is of interest, the classifier may include only a fast rejection stage to provide such screening.

Existing fast rejection stages used in word spotting have typically been based on global features such as the aspect ratio or width of the extracted image. These global features are fast to compute, and can produce low false rejection rates. However, these features are not strongly discriminatory and tend to produce high false positive rates in the initial classifier. The effectiveness of such features for classification can also be highly dependent on the word to be spotted. For example, the aspect ratio feature is highly discriminatory for words of interest that have an unusual aspect ratio, but is less effective for "typical" words that have typical aspect ratios similar to numerous other words. In general, features for detecting a particular object type should exhibit large variation between objects of different types, and small variation amongst objects of the particular object type to be detected. The effectiveness of the features is also related to how well they deal with the variations present in the object they describe. In the case of word spotting one such variation is writing style. For example, the aspect ratio can strongly vary for the same word between different writers. A robust feature exhibits small variation for the same word written by different writers, but large variation for different words even if written by the same writer.

On the other hand, localized features computed using a sliding window or the like can be strongly discriminatory, but are computationally intensive, and therefore typically not well suited for use in an initial fast rejection stage of a cascaded classifier.

While word spotting is presented herein as an illustrative application, it will be appreciated that other applications would benefit from a features generator for generating features corresponding to an image that is readily configurable for different applications and provides features of substantial discriminatory value without concomitant computational complexity. Such a features generator would have value in numerous systems, including classification systems operating in conjunction with suitable classifiers, indexing and search systems, and so forth.

BRIEF DESCRIPTION

In some illustrative embodiments disclosed as illustrative examples herein, an image analyzer is disclosed, comprising: an image partitioner configured to find a partition point that divides a received image into four sub-images each having a pre-selected activated pixel count; a recursion processor configured to (i) apply the image partitioner to an input image to generate a first partition point and four sub-images and to (ii) recursively apply the image partitioner to at least one of the four sub-images for at least one recursion iteration to generate at least one additional partition point; and a formatter configured to generate a features representation of the input image in a selected format, the features representation being based at least in part on the partition points.

In some illustrative embodiments disclosed as illustrative examples herein, an image analysis method is disclosed, comprising: finding a partition point that divides an input image into four sub-images each having a pre-selected activated pixel count; recursively repeating the finding for the four sub-images one or more times to generate a plurality of partition points; and classifying the input image based at least in part on the generated partition points.

In some illustrative embodiments disclosed as illustrative examples herein, an image analyzer is disclosed, comprising: an image partitioner configured to find a partition point that divides a received image into four sub-images each having a pre-selected activated pixel count; a recursion processor configured to recursively apply the image partitioner to an input image to generate a plurality of partition points; and a classifier configured to classify the input image based at least in part on the partition points generated by the recursion processor.

DETAILED DESCRIPTION

Figure 1:
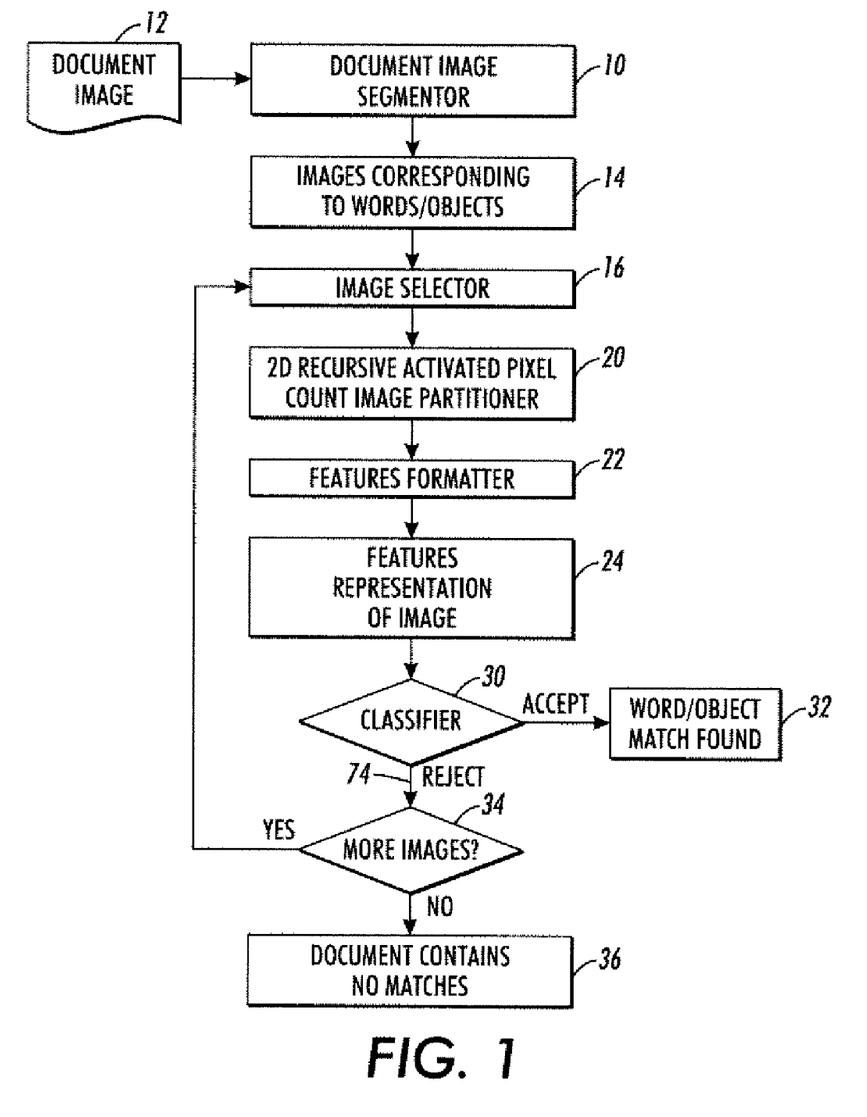
FIG. 1 diagrammatically shows a spotting system for spotting a word, object, signature, or so forth of interest in a document image.

With reference to FIG. 1, an illustrative spotting system includes a document image segmentor 10 that segments a document 12 in image form based on whitespaces or other criteria to extract images 14 corresponding to words or other objects in the document 12. The document image segmentor 10 operates in image space, and its operation generally does not entail OCR. The document image 12 may have been generated or acquired by optical scanning, by a digital camera, by software that outputs textual content in an image format, or so forth. An image selector 16 selects one of the images 14 for processing. In some embodiments, the image selector 16 may perform additionally perform selected image pre-processing, such as converting the image to a gradient image, adjusting resolution, performing pixel value inversion (e.g., to convert a negative image to a positive image), converting from RGB or another color system to a grayscale representation, or so forth.

A two-dimensional recursive activated pixel count image partitioner 20, detailed herein, processes the selected image to identify a center-of-gravity or other statistical center in the two-dimensional image so as to divide the two-dimensional image into four sub-images, which are themselves divided into sub-images, and optionally so forth, in a recursive manner. By performing two or more such iterations, a plurality of partition points are defined. Because of the way the partition points are generated, they are probative of the shape, layout, and other discriminatory characteristics of a word, object, signature or so forth defined by the activated pixels of the selected image.

The output of the two-dimensional recursive activated pixel count image partitioner 20 is a set of partition points that are formatted by a features formatter 22 to define features representation 24 of the image. The features representation 24 may be, for example, a features vector having 2N dimensions corresponding to the x- and y-coordinates of N partition points. Optionally, the x- and y-coordinates may be normalized by the width and height of the image so that the feature vector elements are in the range [0,1], or other data processing or manipulation may be performed. The features formatter 22 optionally may incorporate other probative features of the image into the features representation 24, such as aspect ratio. On the other hand, the features formatter 22 may perform no processing, but merely receives the x- and y-coordinates of the partition points and stores them in a pre-selected order or arrangement (for example, storing coordinates by distance from the origin, or storing all x-coordinates in ascending order followed by all y-coordinates in ascending order, or so forth), or in another standardized format.

A classifier 30 classifies the image based at least on the features representation 24. The classifier 30 can take various forms, and in various embodiments may incorporate one or more linear classifiers, a cascade of classifiers, or so forth. In some embodiments, the classifier 30 is a machine-learning based classifier trained to detect a particular word of interest, particular object of interest (such as for example a corporate logo or other entity logo), particular person's signature, or so forth using a training set including pre-identified image instances of the particular word, object, signature, or so forth. Suitably, the pre-identified images are processed by the two-dimensional recursive activated pixel count image partitioner 20 and the features formatter 22 to generate a corresponding training set of features representations that are used to train the classifier 30. Instead of employing machine learning, the classifier can be otherwise configured or constructed to discriminate the particular word, object, signature, or so forth of interest based on the features representation output by the features formatter 22. For example, the classifier can employ rule-based approaches.

If the classifier 30 indicates a match 32, then the document 12 is deemed to contain the particular word, object, signature or so forth of interest. On the other hand, if the image is not a match, then at a decision block 34 it is determined whether more extracted images are available for processing. If so, then control passes back to the image selector 16 for processing of the next image. On the other hand, if decision block 34 indicates all the extracted images have been examined and no match has been identified, then process flow passes to an operation 36 that addresses the situation where the document 12 contains no instances of the particular word, object, signature, or so forth of interest, for example by discarding the document 12, re-applying the spotting system to the document 12 to look for another word, object, signature, or so forth of interest, or so forth. For increased efficiency, if one is searching for more than one word on any given page segmentation has to be performed only once and the features extracted for detecting an object can optionally be stored and reused in the detection of other objects.

FIG. 1 shows the match 32 as a termination point. This is suitable if it is desired to identify whether the document 12 includes at least one instance of the word, object, signature, or so forth that is of interest. On the other hand, if a listing or count of all occurrences (if any) of the word, object, signature, or so forth of interest is desired, then process flow is suitably transferred from the match 32 to the decision block 34 to continue the spotting process, with the match 32 accumulating a list, count, or other summary of the identified matches.

The various components of the spotting system of FIG. 1 can be variously physically embodied. For example, in some embodiments, a computer, controller, Internet server, personal data assistant (PDA), or other digital device with at least one processor is programmed to implement the document image segmentor 10, image selector 16, two-dimensional recursive activated pixel count image partitioner 20, classifier 30, and related operative components. In some embodiments, a computer readable medium or media such as a magnetic disk, magnetic tape, optical disk, random access memory (RAM), read-only memory (ROM), or so forth is or are encoded with instructions that are executable on a computer or other digital processing device to implement the document image segmentor 10, image selector 16, two-dimensional recursive activated pixel count image partitioner 20, classifier 30, and related operative components. More generally, the spotting system can be embodied purely as hardware, for example an analog, digital, or mixed application-specific integrated circuit (ASIC), or as a combination of hardware such as a computer or other digital device and software executable on said hardware, or a combination of such systems or subsystems.

Having described the illustrative spotting system with reference to FIG. 1 as an illustrative application example, illustrative embodiments of the two-dimensional recursive activated pixel count image partitioner 20 and classifier 30 components are next described.

Figure 2:
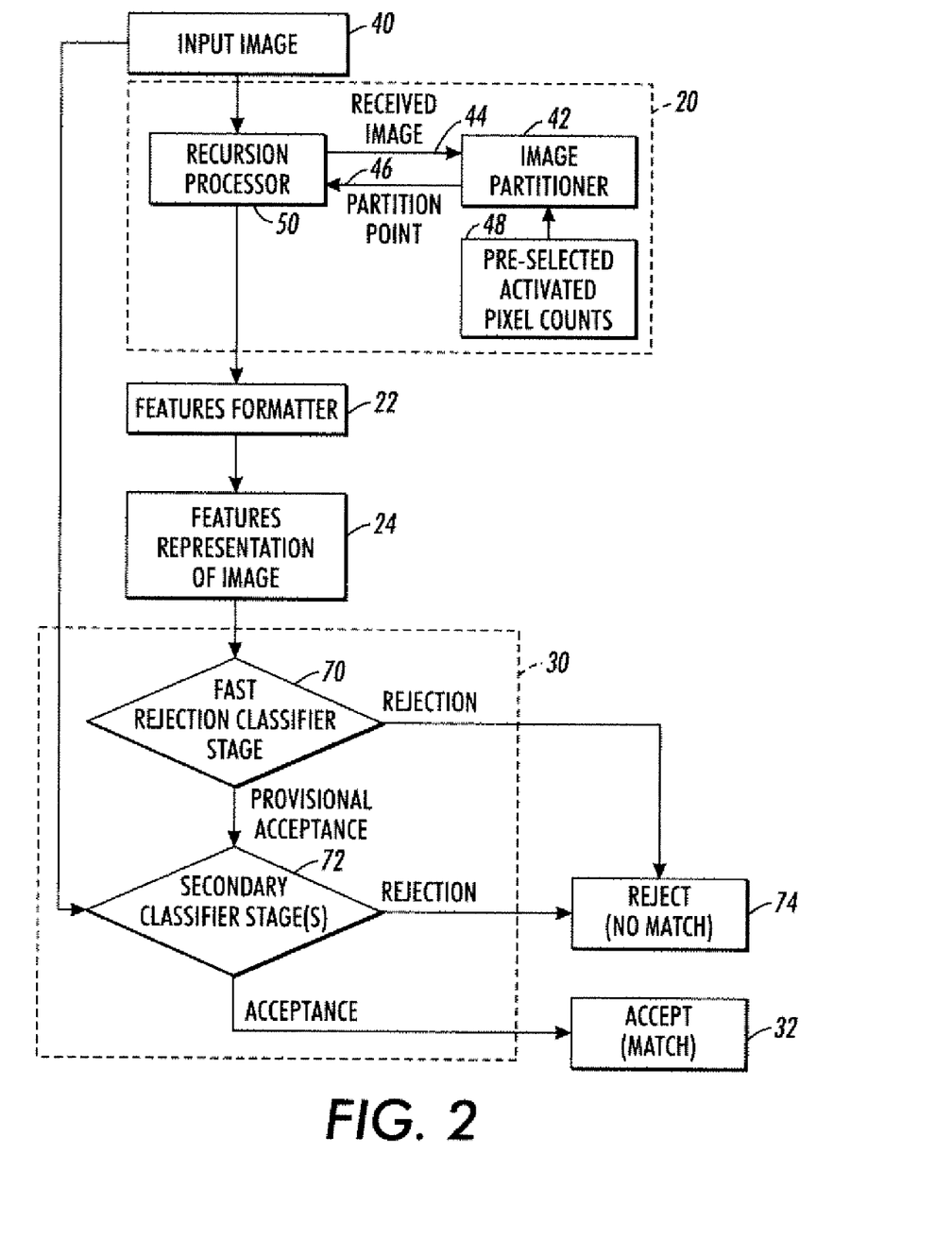
FIG. 2 diagrammatically shows an illustrative embodiment of certain components of the spotting system of FIG. 1 in additional detail.

With reference to FIG. 2, an input image 40 is submitted to the two-dimensional recursive activated pixel count image partitioner 20 for analysis. In the system of FIG. 1, the input image 40 is supplied by the image selector 16; in other applications, the input image 40 may be derived from another source. The two-dimensional recursive activated pixel count image partitioner 20 includes an activated pixel count image partitioner 42 that receives an image 44 and finds a partition point 46 that divides the received image 44 into four sub-images each having specified pre-selected activated pixel counts 48. A recursion processor 50 recursively applies the activated pixel count image partitioner 42 first to the input image 40 and then recursively in at least one further iteration to sub-images defined by the partition point 46 of the first or immediately preceding recursion iteration. Although the activated pixel count image partitioner 42 and the recursion processor 50 are illustrated as separate components in FIG. 2, it is to be appreciated that there may be operative overlap, intercommunication, integration of parts, or so forth between these components 42, 50. For example, in some disclosed embodiments, the activated pixel count image partitioner 42 computes an integral image for the initially received input image 40 as part of the partition point identification processing, and the integral image is stored in one or both components 42, 50 or elsewhere and is re-used in subsequent recursive iterations to compute partition points for the sub-images.

Figure 3:
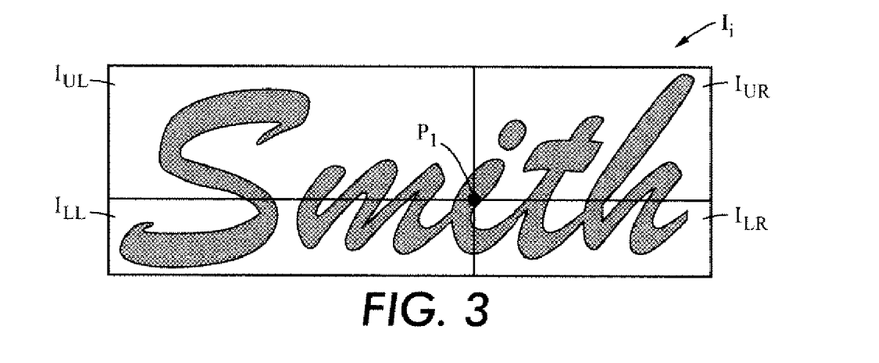
FIGS. 3, 4, and 5 diagrammatically show the first, second, and third recursion iterations, respectively, of a recursive activated pixel count partitioning process performed by the two-dimensional recursive activated pixel count image partitioner of FIGS. 1 and 2.
Figure 4:
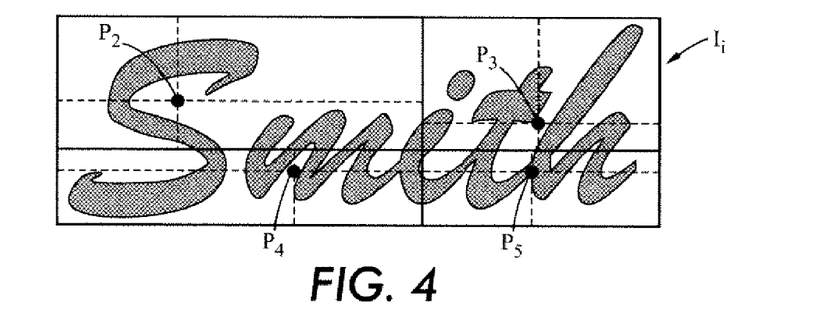
Figure 5:
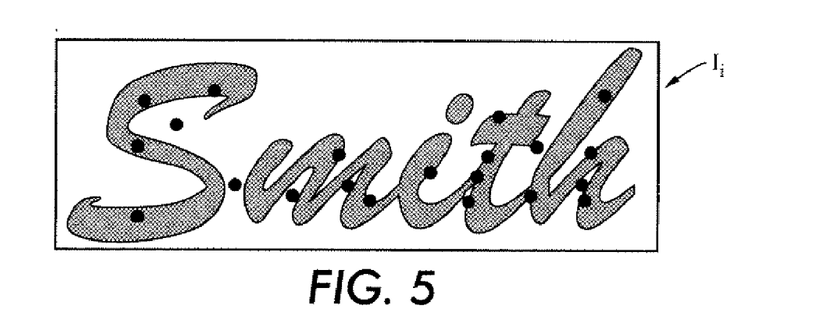

With reference to FIGS. 3-5, determination of partition points for an example input image $I_i$ using the recursive system 20 of FIG. 2 is described. The example input image $I_i$ corresponds to the signature "Smith" wherein the letters of the signature "Smith" are formed of activated pixels (shown in gray in FIGS. 3-5) and the background is formed of unactivated pixels (represented by the white background of FIGS. 3-5). It will be appreciated that if the image is such that the pixel value corresponding to "activated" is the background pixels (sometimes thought of as a "negative" image), then this is suitably addressed by having the image selector 16 (see FIG. 1) or another component perform a pixel value inversion prior to inputting the input image $I_i$ to the two-dimensional recursive activated pixel count image partitioner 20. For example, in the case of handwritten or typed material, the marked areas corresponding to the handwritten or typed text are usually a relatively small fraction of the total area of the image. Accordingly, for word spotting or signature spotting, if the ratio of activated pixels to total pixels for the input image 40 is greater than 0.5, this suggests a negative image and pixel value inversion is suitably performed. In many cases the computation of this value on only an image region is enough to efficiently discriminate background from foreground. In some applications, it may be known a priori that pixel value inversion is (or is not) appropriate for a given input image 40.

FIG. 3 diagrammatically depicts a first iteration, in which the input image $I_i$ is partitioned at a partition point $P_1$ into four sub-images. The partition point $P_1$ is selected by the activated pixel count image partitioner 42 to divide the image into four sub-images, namely an upper lefthand sub-image $I_{UL}$, an upper righthand sub-image $I_{UR}$, a lower lefthand sub-image $I_{LL}$, and a lower righthand sub-image $I_{LR}$, such that the four sub-images $I_{UL}$, $I_{UR}$, $I_{LL}$, $I_{LR}$ have the pre-selected activated pixel counts 48. The term "activated pixel count" as used herein should be broadly construed as encompassing any suitable representation of the count of activated pixels in a sub-image. For example, the activated pixel count for each sub-image may be represented as a percentage value, that is, the activated pixel count for each sub-image may be represented as an activated pixel percentage for each sub-image. Such an activated pixel percentage can be respective to the total number of pixels in the sub-image (which varies depending upon the location of partition point $P_1$ but is readily calculated for each sub-image from the partition point coordinates and, for some sub-images, the length and/or width of the image being partitioned), or respective to the total number of pixels in the image being partitioned (which is independent of the location of partition point $P_1$), or respective to the total number of activated pixels in the image being partitioned, or so forth.

In the partitioning shown in FIGS. 3-5, the pre-selected activated pixel count for each of the four sub-images $I_{UL}$, $I_{UR}$, $I_{LL}$, $I_{LR}$ is the same. That is, a ratio of the activated pixel count for any of the four sub-images $I_{UL}$, $I_{UR}$, $I_{LL}$, $I_{LR}$ respective to the total activated pixel count of the received image $I_i$ is 0.25 to within the computational precision or to within a selected tolerance, precision, or accuracy. (Note, FIGS. 3-5 are illustrative diagrammatic representations, and the positioning of the partition points in these diagrammatic representations may not match with a precise partitioning computation. That is, diagrammatic FIGS. 3-5 may not be drawn to scale or proportion).

In other embodiments, the pre-selected activated pixel counts 48 for the four sub-images $I_{UL}$, $I_{UR}$, $I_{LL}$, $I_{LR}$ may be different. For example, the ratio of the activated pixel count for each of the two lefthand sub-images $I_{UL}$, $I_{LL}$ to the total activated pixel count for the image $I_i$ may be 0.3, while the ratio of the activated pixel count for each of the two righthand sub-images $I_{UR}$, $I_{LR}$ to the total activated pixel count for the image $I_i$ may be 0.2. As another example, the activated pixel counts ratioed to the total activated pixel count may be 0.20, 0.30, 0.22, and 0.28 for the respective four sub-images $I_{UL}$, $I_{UR}$, $I_{LL}$, $I_{LR}$.

With reference to FIG. 4, the activated pixel count partitioning is performed recursively for a second recursion iteration (FIG. 3 depicts the first recursion iteration). In the second recursion iteration shown in FIG. 4, each of the four sub-images $I_{UL}$, $I_{UR}$, $I_{LL}$, $I_{LR}$ is partitioned by respective partition points $P_2$, $P_3$, $P_4$, $P_5$ into four further sub-images. The further sub-images are indicated by dotted separation lines intersecting the partition points $P_2$, $P_3$, $P_4$, $P_5$ in FIG. 4, but the further sub-images are not labeled in FIG. 4.

With reference to FIG. 5, the activated pixel count partitioning is performed recursively for a third recursion iteration. In FIG. 5, sub-images are neither indicated by dividing lines nor labeled. However, in FIG. 5 all partition points including the five partition points $P_1$, $P_2$, $P_3$, $P_4$, $P_5$ generated by the first two recursion iterations and the sixteen additional partition points generated by the third recursion iteration (that is, twenty-one partition points in all) are diagrammatically indicated together (but not labeled).

FIG. 5 illustrates the advantageous "intelligence" of the partition points as features representative of the input image $I_i$. Because each partition point is placed at the center of gravity of the activated pixels of the image or sub-image (for embodiments in which the pre-selected activated pixel counts 48 are the same for all four sub-images) it follows that the partition points will tend to follow the general outline of the text, that is, will tend to follow the shape and layout of the text. For example, in the illustrative image $I_i$, partition points tend to aggregate in the "th" region of "Smith" since that represents a substantial aggregation or concentrated grouping of activated pixels. On the other hand, the partition points are relatively few and spread out in the region of the initial "S" of "Smith" since the letter "S" is of relatively large area but contains relatively few activated pixels. The letter "m" of "Smith" has a high concentration of partition points since this letter also represents a compact aggregation of a substantial number of activated pixels. On the other hand, the "i" of "Smith" is both small and contains few activated pixels, and accordingly is sparsely represented by the partition points.

In some embodiments, as few as two recursion iterations are performed (e.g., corresponding to FIGS. 3 and 4 but omitting FIG. 5). In some embodiments, using three recursion iterations as shown in FIGS. 3-5 has been found to be a good tradeoff between computational complexity and providing a sufficiently discriminatory number of partition points as features. In some embodiments, four or more recursion iterations may be performed. As shown in Table 1, the number of partition points and the size of the features vector grows quickly with the number of recursion iterations. The values given in Table 1 assume that in each recursion iteration, partition points are found for all four sub-images generated by the previous iteration. In this case, the number of partition points is given by:

$$P = \sum_{n=0}^{T-1} 2^{2n}, \quad (1)$$

where T is the number of iterations. This results because each iteration generates four times as many partition points as the previous iteration. If the features representation 24 is a features vector in which the x- and y-coordinates of each partition point define two dimensions of the features vector, then the number of features vector dimensions is 2·P, which is also tabulated in Table 1.

TABLE 1

Number of partition points

| Number of recursion iterations (T) | $P = \sum_{n=0}^{T-1} 2^{2n}$ | Number of features vector dimensions (2 · P) |
|---|---|---|
| 1 (no recursion) | 1 | 2 |
| 2 | 5 | 10 |
| 3 | 21 | 42 |
| 4 | 84 | 168 |
| 5 | 1108 | 2216 |

The number of features vectors can be different from that given in Table 1. For example, the partition points can be normalized with respect to one point, which is not included as a features vector dimension. As an example, one can select the origin of the coordinates as the first partition point. For this choice, the number of features vector dimensions is 2P−2. It is also contemplated that in some embodiments less than all four sub-images may be partitioned in a given recursion iteration, in which case the number of partition points P will again be less than the value given in Table 1. For example, if only two recursion iterations are used and only the upper lefthand and upper righthand sub-images $I_{UL}$, $I_{UR}$ are partitioned in the second iteration, then P=3 rather than the value P=5 shown in Table 1. In another contemplated embodiment, three recursion iterations are performed, in which the second recursion iteration partitions only the upper lefthand and upper righthand sub-images $I_{UL}$, $I_{UR}$ and the third recursion iteration partitions all eight sub-images generated by the partitioning of the upper lefthand and upper righthand sub-images $I_{UL}$, $I_{UR}$. This will result in P=3+8=11 partition points. This latter approach may be computationally efficient if the upper portion of the image is relatively more discriminatory for the word of interest than the lower portion. Consider, for example, the illustrative input image $I_i$ corresponding to "Smith"—the upper portion has a distinctive spread of activated pixels on the left end due to the upper portion of the leftmost "S", a distinctive block of pixels on the right end due to the upper portion of the rightmost "th" along with the dot of the "i", and a relatively empty central region due to the generally low height of the central "mi" portion. On the other hand, the lower portion of "Smith" is less distinctive, consisting of a substantially continuous distribution of activated pixels, and hence may be less discriminatory versus other words such as "Brown". As yet another example, three recursion iterations can generate between 3 and 21 partition points inclusive. The upper limit of 21 corresponds to the entry in Table 1 for T=3. The lower limit corresponds to the second and third recursion iterations each partitioning on only one of the sub-images generated in the previous iteration.

In some embodiments the input image 40 may optionally be a gradient image, obtained for example by applying a pairwise exclusive or ("XOR") operation to each horizontal (or vertical) pixel pair of an original image. Such a gradient image has activated pixels only where a pixel transition ("0"→"1" or "1"→"0") occurs along a row of pixels (or column of pixels in case of a vertical gradient image) in the original image. The two-dimensional recursive activated pixel count image partitioner 20 is generally usefully applicable to either an original input image or to a corresponding gradient image. In some embodiments, it is contemplated to apply the two-dimensional recursive activated pixel count image partitioner 20 to both the original image and to a corresponding gradient image and to have the features formatter 22 concatenate or otherwise combine the results into the features representation 24.

With continuing reference to FIG. 2, the image partitioner 42 can employ various algorithms. For example, if the pre-selected activated pixel counts 48 are the same for all four sub-images, then the partitioning corresponds to a two-dimensional center of gravity determination or, equivalently for this circumstance, a maximum entropy determination. As such, any algorithm for computing a two-dimensional center of gravity in an image, or for computing a point of maximum entropy in an image, can be used to find the partition point 46 in the received image 44.

Figure 6:
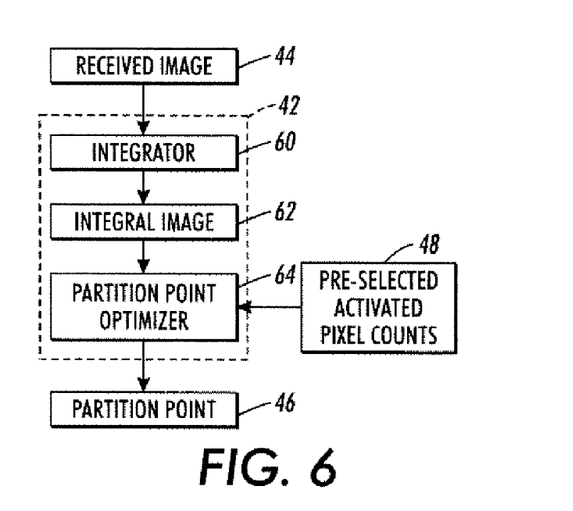
FIG. 6 diagrammatically shows an illustrative embodiment of the activated pixel count image partitioner of FIG. 2.
Figure 7:
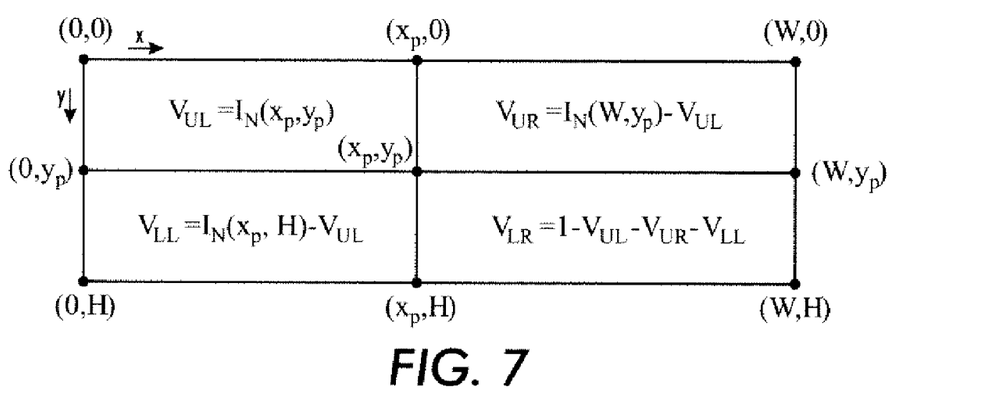
FIG. 7 diagrammatically shows certain aspects of operation of the illustrative activated pixel count image partitioner of FIG. 6.

With reference to FIGS. 6 and 7, to provide further illustration a partitioning algorithm is described that is readily applied when the pre-selected activated pixel counts 48 are the same for all four sub-images, and is also readily applied when the pre-selected activated pixel counts 48 are different for different sub-images. In this approach, an integrator 60 computes an integral image 62 corresponding to the received image 44. The integral image 62 has a one-to-one pixel correspondence with the received image 44. Denoting the received image 44 as J(x,y) and the integral image 62 as I(x,y):

$$I(x, y) = \sum_{\alpha=0}^{x}\sum_{\beta=0}^{y} J(\alpha, \beta), \qquad (2)$$

where J(x,y)=1 for an activated pixel, and J(x,y)=0 for an unactivated pixel. For illustrative purposes, the illustrative coordinate system of FIG. 7 is used for examples herein, in which the coordinate (0,0) is taken as the upper-lefthand corner of the image, the x-axis is horizontal increasing to the right, the y-axis is vertical increasing downward, W denotes the width of the image along the x-axis, and H denotes the height of the image along the y-axis. It is to be appreciated that other coordinate systems can also be used. In some embodiments, the integral image 62 is normalized by the total number of activated pixels in the received image 44, given by I(W,H), that is:

$$I_N(x, y) = I(x, y) / I(W, H) \qquad (3)$$
$$= \left(\sum_{\alpha=0}^{x}\sum_{\beta=0}^{y} J(\alpha, \beta)\right) / \left(\sum_{\alpha=0}^{W}\sum_{\beta=0}^{H} J(\alpha, \beta)\right).$$

As seen in Equation (2) or Equation (3), computing the integral image 62 involves two passes over all pixels of the received image 44. However, re-computing the integral image 62 for any sub-image involves only a single pass.

With continuing reference to FIGS. 6 and 7, pixel values of the integral image 62 are used by a partition point optimizer 64 to find the partition point 46 such that the pre-selected activated pixel counts 48 are obtained. Using the normalized integral image of Equation (3) as the integral image 62, some suitable embodiments of the partition point optimizer 64 iteratively improve a partition point figure-of-merit, such as a cost function $C(x_p,y_p)$ given by:

$$C(x_p, y_p) = \sum_{j} |V_j(x_p, y_p) - N_{a,j}|^k, \qquad (4)$$
$$j = UL, UR, LL, LR.$$

For the cost function figure of merit of Equation (4), iterative improvement comprises iteratively adjusting the partition point $(x_p,y_p)$ to reduce the value of the cost function $C(x_p,y_p)$. In Equation (4), k is a positive scalar such as k=2 (defining an illustrative a sum-of-squares formulation), the index j runs over the four sub-images denoted UL (i.e., upper-lefthand sub-image), UR (i.e., upper-righthand sub-image), LL (i.e., lower-lefthand sub-image), LR (i.e., lower-righthand sub-image), $V_j(x_p,y_p)$ denotes the activated pixel count for the sub-image indexed j for a partition point $(x_p, y_p)$, and $N_{a,j}$ denotes the pre-selected activated pixel count for the jth partition, normalized by the total activated pixel count for the received image 44. The values for the activated pixel counts $V_j(x_p,y_p)$ for a given partition point $(x_p,y_p)$ are readily computed from the integral image 62 as indicated in FIG. 7, that is:

$$V_{UL}(x_p,y_p)=I_N(x_p,y_p) \qquad (5),$$
$$V_{UR}(x_p,y_p)=I_N(W,y_p)-V_{UL} \qquad (6),$$
$$V_{LL}(x_p,y_p)=I_N(x_p,H)-V_{UL} \qquad (7),$$

and $$V_{LR}(x_p,y_p)=1-V_{UL}-V_{UR}-V_{LL} \qquad (8),$$

for the coordinate system of FIG. 7. Advantageously, the activated pixel counts $V_j(x_p,y_p)$ are readily computed using the pixel values of the integral image 62, the activated pixel counts for other sub-images, or a combination thereof. For the special case of k=2 and $N_{a,j}$=0.25 for all of j=UL, j=UR, j=LL, and j=LL, the cost function C(x,y) of Equation (4) can be written as:

$$C(x_p, y_p) = \sum_{j} (V_j(x_p, y_p) - 0.25)^2, \qquad (9)$$
$$j = UL, UR, LL, LR.$$

The cost function $C(x_p,y_p)$ of Equation (4) or of Equation (9) can be minimized respective to the partition point $(x_p,y_p)$ in various ways. In an iterative greedy search approach, an initial candidate partition point $(x_p,y_p)$ is selected, for example at the center of the received image 44, the cost function is computed at the candidate partition point $(x_p,y_p)$ and at surrounding neighboring points, the point having the lowest cost function selected as the new candidate partition point $(x_p,y_p)$, and the process is iteratively repeated until a candidate partition point $(x_p,y_p)$ providing the minimum cost is identified. Other iterative minimization approaches can be used, such as the gradient descent method, the Gauss-Newton method, the Levenberg-Marquardt method, or so forth.

In some embodiments in which the received image 44 is expected to be a handwritten or typed word, number, or the like, the received image 44 is pre-processed prior to input to the integrator 60 by replacing any contiguous group of image columns containing no activated pixels (and thus containing no information), with a single column of unactivated pixels (operation not shown in FIG. 6). This pre-processing advantageously eliminates a source of variance due to different letter or digit spacings sometimes introduced by different writers or font types between certain characters or syllables. For example, replacement of any contiguous group of image columns containing no activated pixels with a single column of unactivated pixels removes a source of difference between a typed word in a kerned proportional font compared with the same typed word in a non-proportional font. Other types of pre-processing can be performed, such as image resizing, filtering, or so forth.

In images of handwritten words, the partition points have substantial dependence upon the distribution of vertical and horizontal connectors in the handwriting. This dependence advantageously enhances the discriminatory ability of the partition points to identify a particular person's signature.

With each recursion iteration, more partition points, and hence more features, are extracted. Because the partition point is selected to partition the distribution of activated pixels in the sub-image, the partition points are robust features that do not lose their discriminatory value at higher numbers of recursive iterations. Indeed, in the limit of a large number of recursive iterations, the identified partition points will substantially define a low resolution version of the original input image. In another view, the recursive activated pixel count partitioning disclosed herein provides a dimensional reduction. By reducing the dimensionality of the images, fast and efficient classifier training can be achieved with relatively few pre-identified training sample images.

For applications such as an initial fast rejection classifier stage for spotting, it is advantageous to balance the discriminatory value of a large number of partition points against computational cost. Accordingly, it is advantageous to keep the number of recursion iterations relatively low for such applications. In some embodiments, three recursion iterations are used for a fast rejection classifier, which as listed in Table 1 provides forty-two features vector dimensions. In some embodiments, both the input image and a corresponding gradient image are processed, yielding eighty-four dimensions for three recursion iterations. The partition point coordinates are optionally normalized by the width and height of the image, for example feature $f_i = x_p/W$ and feature $f_{i+1} = y_p/H$ for the ith and (i+1)th elements of a features vector derived from a partition point denoted $(x_p, y_p)$. Such normalization advantageously eliminates extraneous variation due to page reduction or enlargement produced by a photocopier or otherwise produced.

With returning reference to FIG. 2, the features representation 24 comprising coordinates of the partition points generated by the two-dimensional recursive activated pixel count image partitioner 20 are in some embodiments input to a cascaded classifier including an initial fast rejection classifier stage 70 and one or more secondary classifier stages 72. If an extracted image is rejected by the fast rejection classifier stage 70, then it is deemed rejected 74, that is, not a match for the word, object, signature, or so forth of interest. As shown in FIG. 1, flow then passes to the decision block 34 to consider any remaining extracted images. On the other hand, as shown in FIG. 2 if the fast rejection classifier stage 70 accepts an image as a match, that image is "provisionally" accepted, and is passed to the one or more secondary classifier stages 72 for final acceptance 32 or rejection 74.

The initial fast rejection classifier stage 70 is configured to provide a rapid classification that has a low false rejection rate, that is a low rate of erroneous rejection of images that actually correspond to the word, object, signature, or so forth of interest. Conceptually, the initial fast rejection classifier stage 70 provides pre-filtering to remove many, and in some embodiments a majority, of extracted images that bear little or no resemblance to the word, object, signature, or so forth of interest. The initial fast rejection classifier stage 70 can have a relatively high false acceptance rate, that is a relatively high rate of erroneous acceptance of images that actually do not correspond to the word, object, signature, or so forth of interest. Determining the features, such as partition points, is computationally efficient. The probative nature of partition points leads to a good representation and, in consequence, good performance. In some embodiments, the fast rejection classifier stage 70 is a linear classifier that has been trained with feature vectors extracted using a set of training images including some images pre-identified as corresponding to the word, object, signature, or so forth of interest, and also some images pre-identified as not corresponding to the word, object, signature, or so forth of interest. In some embodiments a kernel classifier such as a support vector machine (SVM)-based classifier or a logistic regression-based classifier is used, with a linear or non-linear kernel. The one or more secondary classifier stages 72 can be more computationally complex so as to be more discriminatory, while still retaining high efficiency for the cascaded classifier 30 because the one or more secondary classifier stages 72 only process a relatively small fraction of the images not filtered out by the initial fast rejection stage 70.

The spotting application disclosed herein was tested on scanned images of handwritten pages in the French language generated by numerous different writers having different handwriting styles and techniques, and including anomalies such as spelling mistakes. The application was also tested on some typed samples. While a number of different words of interest were tested, spotting results for "Monsieur" (750), "Madame" (543), "contrat" (514), and "résiliation" (446) are presented herein, where the number in parentheses after each word denotes the number of actual occurrences of that word in the set of handwritten test document images. The results were quantified by false rejection (FR) and false acceptance (FA) rates. The FR rate indicates the proportion of positive samples incorrectly rejected while the FA rate indicates the proportion of negative samples incorrectly accepted and passed on to subsequent stages. At a k-th step in a cascaded classifier the FR and FA rates can be computed as a product of the FR and FR rates of all individual previous steps (1 . . . i) according to:

$$FR_k = 1 - \prod_{i=1}^{k-1} (1 - FR_i), \tag{10}$$

and $$FA_k = \prod_{i=1}^{k-1} FA_i. \tag{11}$$

False rejection and false acceptance rates can be measured "per word" or "per document." In a "per document" rate, each document image containing or not containing the spotted word is counted as global true or false accept or reject. The FR and FA rates set forth herein are "per word" rates.

Depending on the overall FR rate one wants to allow for the cascaded classifier 70, 72, the FR rates of the different classifier stages can be tuned or allocated. In some experiments, a global FR rate of 5% was targeted. The initial fast rejection classifier 70 was tuned to provide FR rates of between 1% and 4%, and the corresponding global FA rates were computed for a global FR rate of 5% using five-fold cross-validation. In some preferred tuning arrangements, the FR rate for the initial fast rejection classifier 70 was 2%. Table 2 shows results for the fast rejection stage disclosed herein employing both partition points and image width as features, compared with a fast rejection filter employing only the feature width feature.

TABLE 2

| Word of interest | FA (Width feature only) | FA (width plus 21 partition points as features) |
|---|---|---|
| Monsieur | 24% | 19% |
| Madame | 25% | 13% |
| contrat | 28% | 10% |
| résiliation | 32% | 24% |

Table 2 tabulates false acceptance rates for sample words for initial fast rejection filters tuned to have a FR rate of 5%. The center column of Table 2 shows the FA rates for the initial fast rejection stage employing only the bounding box width as a feature—this stage has a FR rate of 5%. The right column shows FA rates for an embodiment of the fast rejection filter 70 comprising two cascaded stages—(i) the bounding box filter tuned to FR rate of 2%; and (ii) a second stage using twenty-one activated pixel count partition points (i.e., three recursion iterations) as features and tuned to have a FR of slightly more than 3% (providing a FR rate of about 5% for the cascade). As seen in the righthand column of Table 2, the FA rate is less than 25% for all four reported test words— accordingly, the classifier stage 72 would generally receive less than 25% of the candidate words. This, in turn, enables the subsequent classifier stage 72 to employ a more computationally costly processing scheme providing a more focused discriminative approach, since it processes relatively few of the images extracted from the document image 12. For further comparison, some existing hidden Markov Model (HMM)- based classifiers were applied to the words reported in Table 2, and achieved FA rates not better than 40% when tuned to provide a FR rate of 5%. In comparison, the present approach provided advantageously lower FA rates of 10%-24% as shown in Table 2, enabling equivalent or better performance at comparable or lower computational expense.

In some embodiments, it is contemplated for the classifier to include parallel stages. For example, to detect a word of interest in either handwritten or typed form, it is contemplated to have two initial fast rejection stages arranged in parallel and respectively trained for the handwritten and typed versions of the word. An extracted image is provisionally accepted (that is, passes the initial fast rejection stage) if it is accepted by either one of the two parallel classifiers. More complex classifier configurations are also contemplated, such as multiple parallel classifiers to account for different type fonts or so forth.

In some embodiments, it is contemplated for results obtained by the initial fast rejection classifier stage 70 to be forwarded to the one or more additional classifier stages 72. The downstream classifier or classifiers 72 can benefit from the candidate scores computed in the fast rejection classifier stage 70. A test conducted on a random set of six document images containing the target word "résiliation" showed that if the document image contained the spotted word, the corresponding true positive candidates were always ranked among the top 5% candidates.

In one contemplated approach suitable for spotting "at least one" occurrence of a word in a document image, the downstream classifier or classifiers 72 suitably receives the extracted images that are highest ranked by the fast rejection stage 70 first. In this application, processing can be terminated upon detection of a single occurrence of the word of interest. By inputting the highest ranked extracted images to the classifier 72 first, the likelihood of obtaining an early match is substantially enhanced.

The spotting application described with reference to FIG. 1 is an illustrative example. The image analysis provided by the two-dimensional recursive activated pixel count image partitioner 20 and features formatter 22 of FIG. 2 can be used in other applications. For example, another contemplated application is identification of documents containing similar words, objects, signatures, or so forth. In such an application, the two-dimensional recursive activated pixel count image partitioner 20 and features formatter 22 provides a features representation of the images that is not input to a classifier, but rather is compared by a comparator (not shown) with features representations of images extracted from other documents.

For example, an ending portion of a document image can be segmented by the segmentor 10 and the extracted images processed by the two-dimensional recursive activated pixel count image partitioner 20 and features formatter 22 of FIG. 2 to generate feature representations that are linked to the original document image. Since the writer's signature is typically at or near the end of the document, these features representations are likely to include a features representation of the writer's signature, if any is present. Then, for example, if a user is viewing a document signed by a particular person and wants to find other documents signed by the same person, the user can select the signature. The selected signature is then processed by the two-dimensional recursive activated pixel count image partitioner 20 and features formatter 22 of FIG. 2 to generate a feature representation of the signature that can then be compared with the features representations associated with other document images to identify any similarly signed document image. This application does not entail use of a classifier, but rather employs a comparator.

Another illustrative application is trademark searching. A trademark search entails manually reviewing similar trademarks in a database or register of trademarks to identify similar trademark images. By using the two-dimensional recursive activated pixel count image partitioner 20 and features formatter 22 of FIG. 2, a database or register of trademark images can be converted to associated features representations. When a trademark candidate is to be searched, the two-dimensional recursive activated pixel count image partitioner 20 and features formatter 22 of FIG. 2 are applied to the trademark candidate to generate a features vector for comparison by a comparator (not shown) with the features vectors of existing trademarks to identify any potentially similar marks. As was the case with the illustrative spotting application, such a comparator is advantageously tuned to have a low false rejection rate so as to avoid missing a conflicting trademark, but can have a relatively high false acceptance rate since any trademarks detected as "similar" will be reviewed by the user.

As disclosed herein, the formatter 22 is configured to generate the features representation 24 of the image from the image selector 16 in a selected format, the features representation being based at least in part on the partition points generated by the two-dimensional recursive activated pixel count image partitioner 20. In embodiments such as those represented by the rightmost column of Table 1, the features representation 24 includes the coordinates of the partition points directly as features, formatted in a selected format such as for example having all x-coordinates listed from smallest to largest followed by all y-coordinates listed from smallest to largest. In other embodiments, the features representation 24 may have features based on the partition points in other ways. For example, the features representation 24 may have features corresponding to aspect ratios of the sub-images defined by the partition points, these features being based on the partition points because the sub-images are defined by the partition points. Additionally, the features representation 24 may optionally include components not based on the partition points, such as a feature corresponding to the aspect ratio of the input image prior to any partitioning.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An image analyzer comprising:
    an image partitioner configured to find a partition point that divides a received image into four sub-images each having a pre-selected activated pixel count, wherein the image partitioner includes:
        an integrator configured to compute a two-dimensional integral image from the received image, and
        a partition point optimizer configured to iteratively improve an initial partition point to find the partition point that divides the received image into four sub-images each having a pre-selected activated pixel count, the partition point optimizer using pixel values of the two-dimensional integral image to compute a partition point figure-of-merit for each iterative improvement;
    a recursion processor configured to (i) apply the image partitioner to an input image to generate a first partition point and four sub-images and to (ii) recursively apply the image partitioner to at least one of the four sub-images for at least one recursion iteration to generate at least one additional partition point and additional sub-images; and
    a formatter configured to generate a features representation of the input image in a selected format, the features representation being based at least in part on the partition points;
    wherein the image analyzer comprises a digital device with at least one processor programmed to implement at least the image partitioner and recursion processor.

2. The image analyzer as set forth in claim 1, wherein the partition point figure-of-merit is operatively equivalent to $$\sum_{j=1}^{4}(V_j - R_j)^k$$

where $V_j$ denotes an activated pixel count for the jth sub-image for the partition point of the iterative improvement, $R_j$ denotes the pre-selected activated pixel count for the jth sub-image, k denotes a numerical parameter, and the $V_j$ are derived from at least one of (i) other $V_j$ values and (ii) one or more pixel values of the two-dimensional integral image.

3. The image analyzer as set forth in claim 1, wherein the recursion processor is configured to (i) apply the image partitioner to an input image to generate a first partition point and four sub-images and to (ii) recursively apply the image partitioner to all four sub-images for at least one recursion iteration to generate at least four additional partition points.

4. The image analyzer as set forth in claim 3, wherein the recursion processor performs two recursion iterations to generate twenty-one partition points.

5. The image analyzer as set forth in claim 1, wherein the pre-selected activated pixel count is the same for all four sub-images.

6. The image analyzer as set forth in claim 1, further comprising:
    a classifier configured to classify the input image based at least on the features representation of the input image.

7. The image analyzer as set forth in claim 6, wherein the classifier comprises:
    an initial fast rejection stage that rejects or provisionally accepts the input image based at least on the features representation of the input image; and
    at least one additional stage that rejects or accepts any provisionally accepted input image based on characteristics of the input image.

8. The image analyzer as set forth in claim 1, further comprising:
    a classifier configured to spot whether the input image corresponds to a selected word based at least on the features representation of the input image.

9. An image analyzer comprising:
    an image partitioner configured to find a partition point that divides a received image into four sub-images each having a pre-selected activated pixel count, the image partitioner including:
        an integrator configured to compute a two-dimensional integral image from the received image, and
        a partition point optimizer configured to find the partition point that divides the received image into said four sub-images each having a pre-selected activated pixel count, the partition point optimizer using pixel values of the two-dimensional integral image to compute activated pixel counts in the four sub-images;
    a recursion processor configured to recursively apply the image partitioner to an input image to generate a plurality of partition points; and
    a classifier configured to classify the input image based at least in part on the partition points generated by the recursion processor;
    wherein the image analyzer comprises a digital device with at least one processor programmed to implement at least the image partitioner and recursion processor.

10. The image analyzer as set forth in claim 9, wherein the classifier is configured to spot whether the input image corresponds to a selected word.

11. The image analyzer as set forth in claim 9, wherein the classifier is configured to spot whether the input image corresponds to a selected signature.

12. The image analyzer as set forth in claim 9, wherein the pre-selected activated pixel count is the same for each of the four sub-images.

13. The image analyzer as set forth in claim 9, wherein the recursion processor is configured to recursively apply the image partitioner to the input image for at least two recursive applications to generate P partition points where $$P = \sum_{n=0}^{T-1} 2^{2n}$$

and T is the number of recursive applications.

14. The image analyzer as set forth in claim 9, wherein the image partitioner is configured to find a single partition point that divides the received image into four sub-images each having a pre-selected activated pixel count and the image analyzer further comprises:
    a formatter configured to generate a features representation of the input image in a selected format, the features representation being based at least in part on the partition points;
    wherein the classifier is configured to classify the input image based at least on the features representation of the input image.

15. The image analyzer as set forth in claim 14, wherein the formatter is configured to generate the features representation in a features vector format having at least some dimensions corresponding to coordinates of one or more of the partition points.

16. The image analyzer as set forth in claim 14, wherein the classifier comprises:
- an initial fast rejection stage that rejects or provisionally accepts the input image based at least on the features representation of the input image; and
- at least one additional stage that rejects or accepts any provisionally accepted input image based on characteristics of the input image.

17. The image analyzer as set forth in claim 16, wherein the at least one additional stage rejects or accepts any provisionally accepted input image based on characteristics of the input image including the features representation of the input image and at least one additional characteristic of the input image.

18. The image analyzer as set forth in claim 14, wherein the classifier is configured to spot a whether the input image corresponds to a selected object based at least on the features representation of the input image.

19. The image analyzer as set forth in claim 18, further comprising:
- a document image segmentor configured to segment a document image into a plurality of input images that are input to the recursion processor and classifier to determine whether the document image contains the selected object.

20. The image analyzer as set forth in claim 18, wherein the selected object is selected from a group consisting of (i) a selected word, (ii) a selected logo, and (iii) a selected signature.

21. The image analyzer as set forth in claim 9, wherein the pre-selected activated pixel count is different for at least two of the four sub-images.

22. The image analyzer as set forth in claim 9, wherein the classifier is a linear classifier.

* * * * *